United States Patent

[11] 3,598,340

| [72] | Inventor | David B. Thurston |
| | | Springvale, Maine |
| [21] | Appl. No. | 864,626 |
| [22] | Filed | Oct. 8, 1969 |
| [45] | Patented | Aug. 10, 1971 |
| [73] | Assignee | Thurston Aircraft Corporation |
| | | Sanford, Maine |

[54] AIRPLANE AILERON SYSTEM
4 Claims, 4 Drawing Figs.

| [52] | U.S. Cl. | 244/90 |
| [51] | Int. Cl. | B64c 5/08 |
| [50] | Field of Search | 244/90 |

[56] References Cited
UNITED STATES PATENTS

| 1,664,204 | 3/1928 | Fokker | 244/90 |
| 1,785,620 | 12/1930 | Frise | 244/90 (X) |
| 2,507,741 | 5/1950 | Trimble, Jr. | 244/90 |

*Primary Examiner*—Milton Buchler
*Assistant Examiner*—Carl A. Rutledge
*Attorney*—Eliot S. Gerber ABSTRACT: The ailerons of an airplane are specially designed to permit better control of the aircraft. The aileron is provided with an integral or attached extension portion which moves, below the wing, in coordination with the movement of the aileron.

AIRPLANE AILERON SYSTEM

DESCRIPTION

The present invention relates to airplanes and more particularly to the construction of airplane ailerons, particularly for use on single engine airplanes and seaplanes.

One of the greatest difficulties facing pilots of light airplanes has been in their control of the aircraft at low speeds. Pilots of light single-engine aircraft have comparatively greater difficulty in handling their aircraft at low speeds than they do in flying the aircraft at higher speeds. This difficulty is faced by novice and experienced pilots alike. However, it is more of a problem for novice pilots who may not have sufficient experience to cope with strong crosswinds, air turbulence, or other factors which may adversely affect their control of their planes at the low speed experienced during landing and takeoff.

The problem of low speed control of aircraft is particularly acute in connection with those seaplanes in which a single engine is mounted above the wings. Some seaplanes are assembled by adding pontoons (a pair of floats) in place of the conventional wheels on the fixed main landing gear of light single-engine planes. These are called floatplanes. Floatplanes tend to be unstable in crosswinds as only the lateral spacing between the two pontoons prevents the plane from tipping over when there is an overturning wind force from one side or the other. Flying boats are seaplanes in which the body acts as a boatlike hull, that is, the plane's hull rests directly on the water. The engine and propeller cannot be mounted directly at the front of the body, as in some other single-engine land planes, as the propeller would dip into the water. Consequently, the engine and propeller are mounted above the wing, usually on supporting struts. The engine may be mounted either for pusher operation, that is, with the propeller facing the tail, or for tractor operation, that is, with the propeller facing forward. The flying boat type of seaplane may be converted into an amphibian by adding retractable wheels so that the plane may operate from land as well as from the water.

The location of the engine and propeller in a single engine flying boat may pose a difficulty in regard to the effectiveness of the vertical tail and rudder. The vertical tail provides directional stability, while the rudder is used to effect the directional movement of the plane, that is, steer the plane right or left in regard to a vertical reference axis through the plane's fuselage. However, at low speed, particularly where the engine and propeller are mounted directly in front of the vertical tail, the velocity and turbulence of the slipstream over the vertical tail may vary with engine power and propeller pitch setting in such manner that the directional stability of the airplane is reduced below acceptable levels. At low speeds, and with motor power off, in those planes in which the propeller and motor are mounted directly in front of the vertical tail, the propeller goes from positive thrust to negative thrust; that is, instead of the propeller driving the air, the air passing through the propeller blades has the effect of driving the propeller. When such a negative thrust occurs, turbulent air spills over the vertical tail and reduces directional stability.

When turning in flight, the effect of moving the aileron in coordination with movement of the rudder always results in some measure of what is termed "adverse yaw". Adverse yaw is an undesirable deviation of the airplane from its line of flight, about its vertical axis. Adverse yaw is particularly serious, and may even present a danger to novice pilots, in those instances when directional stability has been reduced during low speed flight.

It is the objective of the present invention to provide an aileron construction which will enable the pilots of airplanes to have improved flight control of their planes at low speed, power on or power off, by counteracting the effects of adverse yaw coupled with reduced directional stability, or through counteracting the effects of adverse yaw alone.

It is a further objective of the present invention that the aileron system not add greatly to the complexity, weight, cost or maintenance problems of the aircraft.

It is a further objective of the present invention to provide an aileron system which will enable pilots of seaplanes having a single engine mounted over the wing to control their aircraft at low speeds.

In accordance with the present invention, a novel construction of an aileron system is provided to counteract adverse yaw. In the aileron system of the present invention, an added portion of the aileron, or a separate but coordinated member, projects ahead of the aileron hinge line and moves only below the level of the wing. The projected member or extension moves in exact coordination with movement of the aileron. Preferably the aileron is formed with an integral extension member called, for the purposes of this patent application, a "spoileron". This extension member, or spoileron, because it is preferably integral with the aileron, moves in exact proportion to the movements of the aileron. The spoileron (extension member) is formed so that, when the aileron is up (above the level of the wing) the spoileron is down (below the level of the wing). The spoileron provides a sufficient effect, due to air passage over its surface, to counteract the effect of adverse yaw. When the aileron is down, the spoileron moves up inside the wing but does not protrude above the wing upper surface. This enables planes, and particularly single-engine seaplanes, to be more readily controlled at low speeds by reducing aileron adverse yaw.

Other objectives will be apparent from the following detailed description of the inventor's preferred embodiment of his invention, taken in conjunction with the accompanying drawings. In the drawings.

Figure 1:
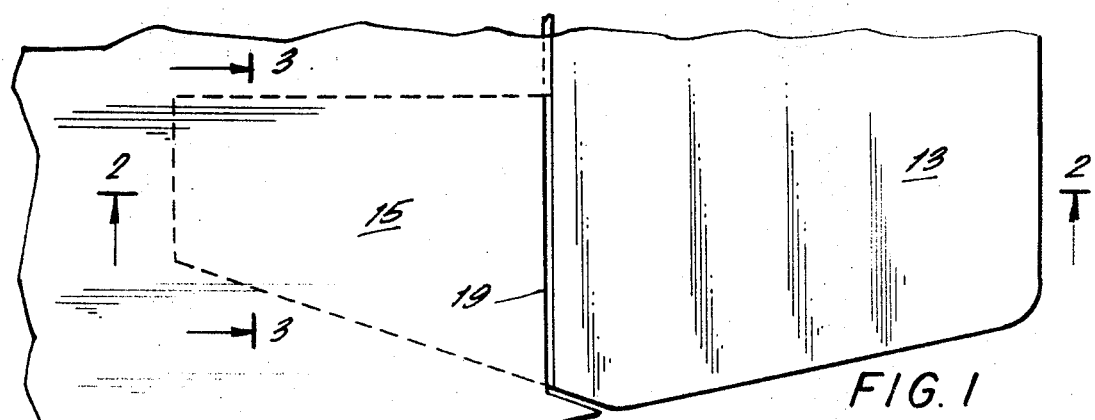
FIG. 1 is a top view of a portion of the left wing of an airplane utilizing the aileron system of the present invention.

FIG. 1 illustrates the present invention as applied to the left wing of an airplane. It will be understood, of course, that generally the airplane will have two wings, both of which are, having regard to symmetry, of the same form of construction. That is, the wing and aileron system on the right would be of the same construction as described below in connection with the left wing. The term "right" means the pilot's right hand as the pilot is facing forward.

Figure 2:
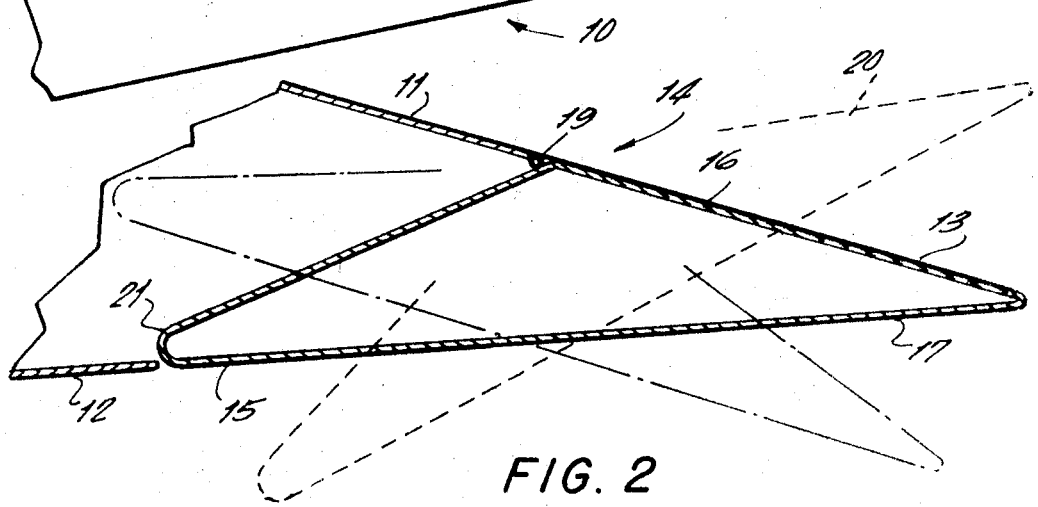
FIG. 2 is a cross-sectional side view of the aileron showing its extension member (spoileron)

The wing 10 includes, as shown more particularly in FIG. 2, an upper wing surface 11 and a bottom wing surface 12. These surfaces consist of aluminum sheets or other strong and lightweight metals which are riveted or otherwise adhered to supporting ribs. However, other forms of construction, such as a fiberglass, foam core, or honeycomb construction, are equally applicable to the wings and ailerons of the present invention.

The aileron 14 may be analyzed, and is considered in the terminology of the application, as consisting of two portions, although preferably the aileron is an integral assembled unit. The first portion, which may be the same form as a conventional aileron, will be called the first aileron, and the second portion, which is novel to this patent application, will be called the second aileron or "spoileron".

The first aileron 13 has a trailing edge which continues the trailing edge of the wing. FIG. 1 shows only the left-hand portion of the first aileron as the full aileron may be one-third of the length of the wing. The second aileron 15, or spoileron, is an integral extension of the first aileron 13. They are constructed to form a continuous unit having an upper surface 16, a bottom exterior surface 17, and an upper interior surface 18. In its normal position the upper aileron surface 16 is continuous with the upper wing surface 11 and provides a part of the lifting surface, which is the function of the wing. Similarly, in its normal position (during straight line of flight) the aileron's bottom surface 17 is a continuation of the bottom surface 12 of the wing. Preferably the upper interior surface 18 is within the wing, that is, between the upper surface 11 and the bottom surface 12 of the wing in the position of the aileron during a straight line of flight.

The aileron is pivotally mounted to the wing by means of a hinge 19. The hinge is shown at the top of the aileron but may alternatively be at its center, top, below the aileron, or at intermediate positions. A control cable or push rod, as in conventional aileron construction, has its end connected to the aileron and passes, by means of pulleys and/or bell cranks within the wing, to the aileron control stick (or wheel) within the cabin of the airplane.

The solid line showing of the aileron in FIG. 2 gives the normal position of the aileron with its surface continuing the upper and bottom surface of the wing. This would be the position of the aileron when the airplane is flying in a normal straight line of flight. The upper position of the first aileron is shown in dash-dot lines 20 and illustrates the position of the aileron when the plane is turning or otherwise performing a maneuver using the left aileron. In that position its bottom surface 17 is raised above the upper surface 11 of the wing. At the same time, and simultaneously, the second aileron (spoileron) 15 is lowered below the lower surface of the wing. The passage of the air over the second aileron (spoileron) has the effect of counteracting adverse yaw resulting from a maneuver placing the first aileron into its raised position and the opposite aileron into its lowered position, and vice versa.

The leading edge 21 of the second aileron (spoileron) 15 is shown in FIG. 2 as having a rounded cross section. However, that edge may alternatively, depending upon the design of the plane, have other cross sections, for example, coming to a point or having other forms of curvature.

Figure 3:
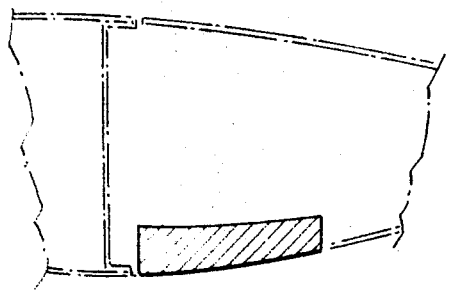
FIG. 3 is a sectional view taken along section 3-3 of the extension member (spoileron)
Figure 4:
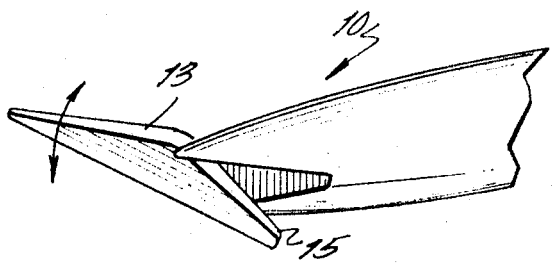
FIG. 4 is a perspective view of the wing tip showing the aileron raised above the level of the wing surface and the extension member (spoileron) lowered below the level of the wing surface.

The cross-sectional view of FIG. 3 shows a preferred embodiment of the second aileron or spoileron. It will be understood, however, that other shapes in cross section could be used, depending upon the flight characteristics of the airplane, wing tip design, and other aerodynamic factors.

As an alternative to the integral aileron assembly shown in the drawing, the first aileron and the second aileron (spoileron) may be entirely separate from each other. They may be separately hinged and controlled. However, the control must be such that they would move simultaneously in opposite directions relative to the bottom (or top) surface of the wing.

Although the present description has been of a specific form of aileron system particularly adapted for light planes, it will be understood that the problem of adverse yaw is encountered in all planes, including large planes, multiengine planes, and planes adapted for low speed and supersonic flight. The second aileron (spoileron) may be adapted for use in all types of aircraft. The second aileron (spoileron) may be located on any point along the aileron span, i.e., at other than the aileron tip. For example, in high-speed airplanes the second aileron (spoileron) may be located near the aileron control point to reduce the buildup of torque in the aileron structure.

As mentioned before, the position hinge for the aileron, when the first and second ailerons are parts of an integral structure, may be at the top (above the top surface of the wing) intermediate (internal hinging) or bottom (below the bottom surface of the wing). As shown in FIG. 1 the plan view of the spoileron is something of a rectangle with one side not parallel to its opposite side. However, the spoileron may have other forms in plan view, for example, truly rectangular, square, or even curved. The spoileron shown in that figure is shown, in plan view, as being located behind the wing tip (side edge of the wing). However, the spoileron may be located further outward, at the wing tip, or further inward from the wing tip.

I claim:

1. In an airplane having wings, an aileron system including a first aileron portion pivotally connected to the wing, said first aileron in its normal position performing part of the lifting function of the wing and in its operated position being extended above or below the level of the top surface of the wing, a second aileron tip portion pivotally connected to the wing and only in its operated position being extended below the level of the bottom surface of the wing, said second aileron tip portion having its top surface positioned and enclosed within the curvature and skin of the wing in its normal position during a straight line of flight, wherein the two aileron portions are integral portions of a single assembly and have a common pivot means, and wherein said second aileron tip portion when viewed from the top is smaller in area than said first aileron portion, and means to control the two ailerons so that they operate simultaneously and in opposite directions relative to the bottom surface of the wing.

2. An aileron system as in claim 1 wherein the hinge means is positioned at the top of the ailerons.

3. An aileron system as in claim 1 wherein the leading edge of the first aileron is curved in cross section.

4. An aileron system as in claim 1 wherein the second aileron is of a truncated sector in cross section.